(12) United States Patent
Mo et al.

(10) Patent No.: US 9,107,062 B2
(45) Date of Patent: Aug. 11, 2015

(54) QOS CONTROL IN PCRF BASED ON USAGE AND TIME OF DAY

(75) Inventors: Fan Mo, Ottawa (CA); Lui Chu Yeung, Kanata (CA); Kevin Scott Cutler, Carp (CA); Hamdy Farid, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 757 days.

(21) Appl. No.: 13/411,143

(22) Filed: Mar. 2, 2012

(65) Prior Publication Data

US 2013/0231081 A1 Sep. 5, 2013

(51) Int. Cl.
*H04W 4/26* (2009.01)
*H04W 72/04* (2009.01)
*H04L 12/24* (2006.01)
*H04L 12/14* (2006.01)

(52) U.S. Cl.
CPC ............. *H04W 4/26* (2013.01); *H04L 12/1432* (2013.01); *H04L 41/5067* (2013.01)

(58) Field of Classification Search
CPC ..... H04W 4/26; H04L 12/1407; H04L 65/80; H04L 47/20; H04L 47/805; H04L 12/1432; H04L 41/5067
USPC .......................... 455/403, 405, 406, 407, 408
See application file for complete search history.

(56) References Cited

U.S. PATENT DOCUMENTS

| | | | |
|---|---|---|---|
| 6,618,355 B1 | 9/2003 | Gulliford et al. | |
| 7,590,732 B2 | 9/2009 | Rune | |
| 8,452,872 B2* | 5/2013 | Castro Castro et al. | 709/224 |
| 8,594,621 B2* | 11/2013 | Mo et al. | 455/406 |
| 8,626,156 B2* | 1/2014 | Marsico | 455/432.1 |
| 8,732,303 B2* | 5/2014 | Lopez Nieto et al. | 709/224 |
| 8,787,174 B2* | 7/2014 | Riley et al. | 370/237 |
| 8,797,859 B2* | 8/2014 | Stenfelt et al. | 370/230 |
| 8,868,029 B2* | 10/2014 | Shu et al. | 455/405 |
| 8,874,729 B2* | 10/2014 | Hu et al. | 709/224 |
| 2006/0187854 A1 | 8/2006 | Booth et al. | |
| 2010/0223661 A1 | 9/2010 | Yang | |
| 2011/0320622 A1 | 12/2011 | Cutler et al. | |
| 2012/0278472 A1* | 11/2012 | Ellis et al. | 709/224 |
| 2012/0290713 A1* | 11/2012 | Ellis | 709/224 |
| 2013/0084826 A1* | 4/2013 | Mo et al. | 455/406 |
| 2013/0122860 A1* | 5/2013 | Dhruva et al. | 455/406 |

OTHER PUBLICATIONS

Specification and Drawings for U.S. Appl. No. 13/117,288, filed May 27, 2011, entitled "QoS Control in Wireline Subscriber Management" (41 pgs.).
Specification and Drawings for U.S. Appl. No. 13/117,357, filed May 27, 2011, entitled "Mapping Accounting AVPS to Monitoring Keys for Wireline Subscriber Management" (45 pgs).
Office Action dated Aug. 5, 2013 from corresponding U.S. Appl. No. 13/117,357.
Office action dated Jan. 2, 2013 for U.S. Appl. No. 13/117,288.

* cited by examiner

*Primary Examiner* — Ajit Patel
(74) *Attorney, Agent, or Firm* — Kramer & Amado, P.C.

(57) ABSTRACT

Embodiments of the invention provide a Policy and Charging Rules Function (PCRF) node and a method for authorizing a Quality of Service (QoS) for a wireless subscriber based on subscriber usage and time-of-day for a 3GPP-compliant packet data network.

13 Claims, 4 Drawing Sheets

QOS CONTROL IN PCRF BASED ON USAGE AND TIME OF DAY

FIELD OF THE INVENTION

The invention is directed to packet switching communication networks, and in particular to Quality of Service (QoS) control in 3GPP-compliant packet data networks.

BACKGROUND OF THE INVENTION

Long Term Evolution (LTE) is a new network scheme recommended by the 3rd Generation Partnership Project (3GPP). In an LTE network, all communications are carried over an IP channel from user equipment (UE) to an all-IP core called the Evolved Packet Core (EPC). The EPC then provides gateway access to other networks while ensuring an acceptable Quality of Experience (QoE) and charging a subscriber for their particular network activity.

The 3GPP generally describes the components of the EPC and their interactions with each other in a number of technical specifications. Specifically, 3GPP TS 23.203, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof. The 3GPP specification allows the Policy and Charging Control (PCC) architecture to interwork with older generation networks (e.g., General Packet Radio Service (CPRS)). For example, 3GPP TS 29.212 and 3GPP TS 29.214 provide some guidance on the establishment of an application session by the EPC upon receipt of an application request from an Application Function (AF) in the form of an AA-Request (AAR) message or from a Packet Data Network Gateway (PGW) in the form of a Credit Control Request (CCR) message. The standards specify that the PCRF is responsible for receiving new service requests, creating new PCC rules commensurate with such requests, and providing these new PCC rules to a Policy and Charging Enforcement Function (PCEF) for installation. The 3GPP standards also define the format of service request messages and PCC rules.

The 3GPP specifications suggest that the PCRF-provided authorized Quality of Service (QoS) at the Internet Protocol Connectivity Access Network (IP-CAN) bearer level, at the QoS Class Identifier (QCI) level and the service flow level. The 3GPP specifications further specify that the level at which the PCRF provides the authorized QoS is based on the bearer control mode—if PCRF or PCEF is responsible for the PCC rule binding—a process of which a PCC rule is bound to a specific IP-CAN bearer. As per the 3GPP specifications, the PCRF provides the authorized QoS at the IP-CAN bearer level when the PCRF does bearer binding (i.e., Bearer control mode is UE-only), and provides the authorized QoS at the QCI level when the PCEF does bearer binding (i.e., Bearer control model is UE_NW). The authorized QoS at the service flow level is provided by the PCRF in both bearer control modes.

The 3GPP specification suggests that the provisioned authorized QoS per QCI applies independently to all IP-CAN bearers with the same QCI, currently active, within the same IP-CAN session. This 3GPP-suggested method provides inefficiencies as the PCRF may not have a complete view of the active IP-CAN bearers at the PCEF or the PCC rule(s) currently bound to them. The problem relates to authorizing QoS per QCI in the mixed mode operation (i.e., Bearer control mode is UE_NW). As per the 3GPP specifications, the Policy and Charging Rules Function (PCRF) may provide Authorized QoS per QCI for the non Guaranteed Bit-Rate (GBR) IP-CAN bearers, when the PCEF performs bearer binding.

With the significant increased adoption rate of wireless high speed internet access and the trend of applications moving toward mobile, the usage consumption in wireless network is growing significantly. Currently, the 3GPP specifications provide no means of efficiently addressing peaks in traffic load. Therefore it would be highly desirable to provide a more fine-grained control of network traffic and a more efficient means of managing resources and distribution of bandwidth in an LTE system.

SUMMARY OF THE INVENTION

One aspect of the present invention is directed to a Policy and Charging Rules Function (PCRF) node for a 3GPP-compliant packet data network, the PCRF node is configured to: receive from a PCEF, a subscriber usage level; monitor the usage of the subscriber by adding the amount of usage to a record of an accumulated usage of the subscriber; determine a current time period; authorize a Quality of Service (QoS) for the subscriber based at least on the usage of the subscriber and the current time period; and transmit an authorization message indicating the QoS that the network should provide to the subscriber.

In some embodiments of the invention the authorized QoS is restricted if the usage of the subscriber exceeds a threshold.

In some embodiments of the invention the authorized QoS is determined by a Policy and Charging Control (PCC) rule set.

In some embodiments of the invention the authorized QoS is communicated to a Policy and Charging Enforcement Function (PCEF).

Some embodiments of the invention the further comprise a reauthorization scheduler that determines that a session must be reauthorized based on a change in current time period, wherein the PCRF reauthorizes the session by determining a new QoS based on the current time period.

Some embodiments of the invention the authorization message comprise a Re-Authorization Request (RAR) message.

Some embodiments of the invention the further comprise: a usage report handler, wherein the usage report handler monitors a monitoring key, the monitoring key corresponding to a type of subscriber usage, at least one threshold amount of usage, and a policy to be applied if the subscriber's usage exceeds the threshold; a usage recorder that updates and stores in a subscriber record, the subscriber's accumulated usage based on the monitoring key corresponding to the subscriber usage, wherein the subscriber's record includes a set of monitoring keys; and a policy engine that applies the policy of a monitoring key if the subscriber's usage has exceeded the at least one threshold of the monitoring key.

Another aspect of the present invention is directed to a method at a Policy and Charging Rules Function (PCRF) node for authorizing a Quality of Service (QoS) for a wireless subscriber. The method comprises steps of: receiving from a PCEF, a subscriber usage level; monitoring the usage of the subscriber by adding the amount of usage to a record of an accumulated usage of the subscriber; determining a current time period; authorizing a Quality of Service (QoS) for the subscriber based at least on the usage of the subscriber and the current time period; and transmitting an authorization message indicating the QoS that the network should provide to the subscriber.

In some embodiments of the invention the authorized QoS is restricted if the usage of the subscriber exceeds a threshold.

In some embodiments of the invention the authorized QoS is determined by a Policy and Charging Control (PCC) rule set.

In some embodiments of the invention the authorized QoS is communicated to a Policy and Charging Enforcement Function (PCEF).

In some embodiments of the invention the determining step determines that a session must be reauthorized based on a change in current time period, wherein the PCRF reauthorizes the session by determining a new QoS based on the current time period.

In some embodiments of the invention the authorization message comprises a Re-Authorization Request (RAR) message.

Some embodiments of the invention the further comprise steps of: monitoring a monitoring key, the monitoring key corresponding to a type of subscriber usage, at least one threshold amount of usage, and a policy to be applied if the subscriber's usage exceeds the threshold; updating and storing in a subscriber record, the subscriber's accumulated usage based on the monitoring key corresponding to the subscriber usage, wherein the subscriber's record includes a set of monitoring keys; and applying the policy of a monitoring key if the subscriber's usage has exceeded the at least one threshold of the monitoring key.

Another aspect of the present invention is directed to a machine-readable storage medium encoded with instructions for a Policy and Charging Rules Function (PCRF) node, the machine-readable storage medium comprising: instructions for receiving from a PCEF, a subscriber usage level; instructions for monitoring the usage of the subscriber by adding the amount of usage to a record of an accumulated usage of the subscriber; instructions for determining a current time period; instructions for authorizing a Quality of Service (QoS) for the subscriber based at least on the usage of the subscriber and the current time period; and instructions for transmitting an authorization message indicating the QoS that the network should provide to the subscriber.

BRIEF DESCRIPTION OF THE DRAWINGS

Some embodiments of apparatus and/or methods in accordance with embodiments of the present invention are now described, by way of example only, and with reference to the accompanying drawings in which.

In the figures, like features are denoted by like reference characters.

DETAILED DESCRIPTION

In wireless networks, some subscribers who use the network heavily may create network congestion, preventing other subscribers from receiving their desired QoS. A similar problem may occur during certain time periods when many users attempt to receive high bandwidth services. Embodiments of the present invention address the need for good and fair control of network traffic by managing the QoS of a subscriber based on each subscriber's usage and time-of-day information, thereby providing a fine grained control on network traffic.

Figure 1:
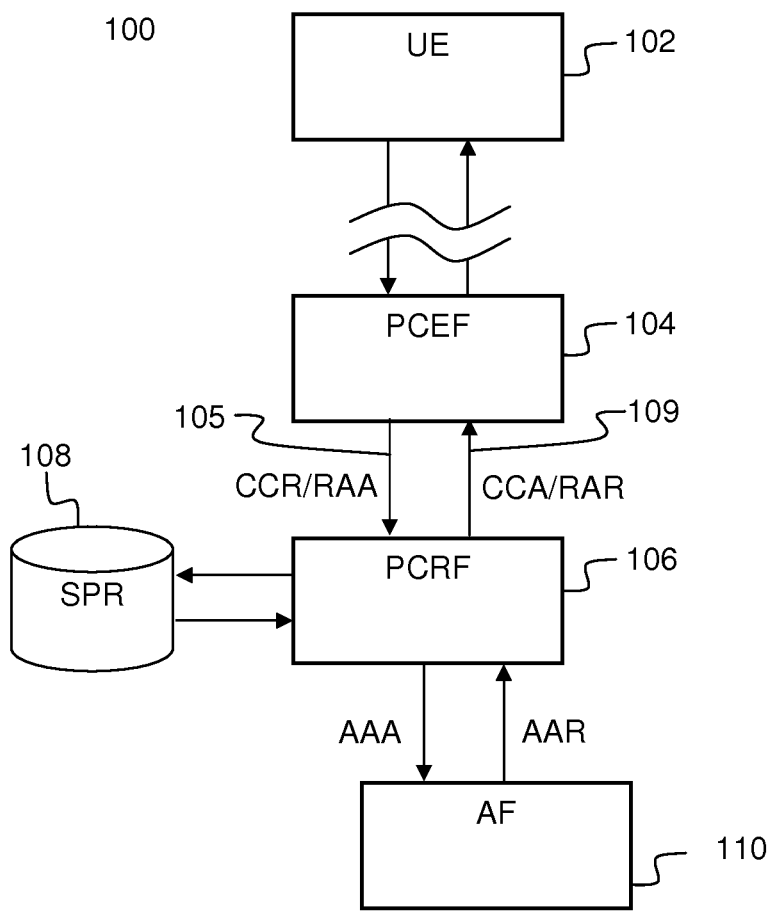
FIG. 1 illustrates a simplified block diagram of an LTE system.

FIG. 1 illustrates a simplified block diagram of an LTE system 100. User Equipment 102 communicates with a PCEF function 104, which can be part of a Packet Data Network-Gateway (PDN-GW) (also referred to as a packet gateway (PGW) node), to initiate a request for service. The PCEF generates a Credit Control Request (CCR) message, such as CCR 105, requesting an appropriate allocation of resources and forwards the request to PCRF node 106. The CCR message to PCRF node 106 includes an EPS-Default-Bearer-QoS Attribute Value Pair (AVP) or QoS Information AVP containing the requested QoS by the subscriber. PCRF validates the message (its syntax, semantics) and then retrieves subscriber data from Subscription Profile Repository (SPR) 108, to determine if the subscriber is valid, and the subscriber's QCI limit for the QCI specified in the request. Generally, the SPR 108 may store the following information, but not limited to, per subscriber, for non-Guaranteed Bit-Rate (non-GBR) calls: Aggregate Maximum Bit Rate (AMBR); the bandwidth limits for each non-GBR QCI; the bandwidth limits for a given application such as voice calls, Voice Over IP (VOIP) calls, or for specific applications such as, for example, Skype or Google Talk. The SPR 108 may be a device that stores information related to subscribers to the network 100. Thus, SPR 108 may include a machine-readable storage medium such as read-only memory (ROM), random-access memory (RAM), magnetic disk storage media, optical storage media, flash-memory devices, and/or similar storage media. SPR 108 may be a component of PCRF node 106 or may constitute an independent node within network 100. Data stored by SPR 108 may include an identifier of each subscriber and indications of subscription information for each subscriber such as bandwidth limits, charging parameters, subscriber priority, and subscriber service preferences.

Based on the event type (e.g., IP-CAN Session establishment, AF Session modification, etc.), the PCRF node 106 returns a Credit Control Answer (CCA) or Re-Authorization Request (RAR) message 109 to the PCEF 104 with the subscriber's QCI limit and authorization to establish or modify a service.

The 3GPP specifications suggest that the PCRF may provide the authorized QoS at the Internet Protocol Connectivity Access Network (IP-CAN) bearer level, at the QoS Class Identifier (QCI) level and the service flow level.

Usage data of each wireless subscriber is collected and stored in the PCRF, according to the metering policy assigned to the subscriber. This metering policy defines a monitoring key and defines a set of associated usage thresholds. Network operators can associate a set of threshold crossing actions with each threshold, including: sending notification; terminate flow, and change QoS. A subscriber can be associated to multiple metering policies with the "best" one being selected for use at any given time.

Various embodiments provide flexible QoS control through an IP-CAN session level usage monitoring key and a PCC rule level usage monitoring key. A session level usage monitoring key can be used to change: session level QoS, as well as QoS for all flows within the IPCAN session. A PCC rule level usage monitoring key can be used to change flow level QoS, not session level QoS. Each individual PCC rule level usage monitoring key can only change QoS of the flows with the monitoring key assigned and will not impact other flows within the IP-CAN session with different usage monitoring key.

Figure 2:
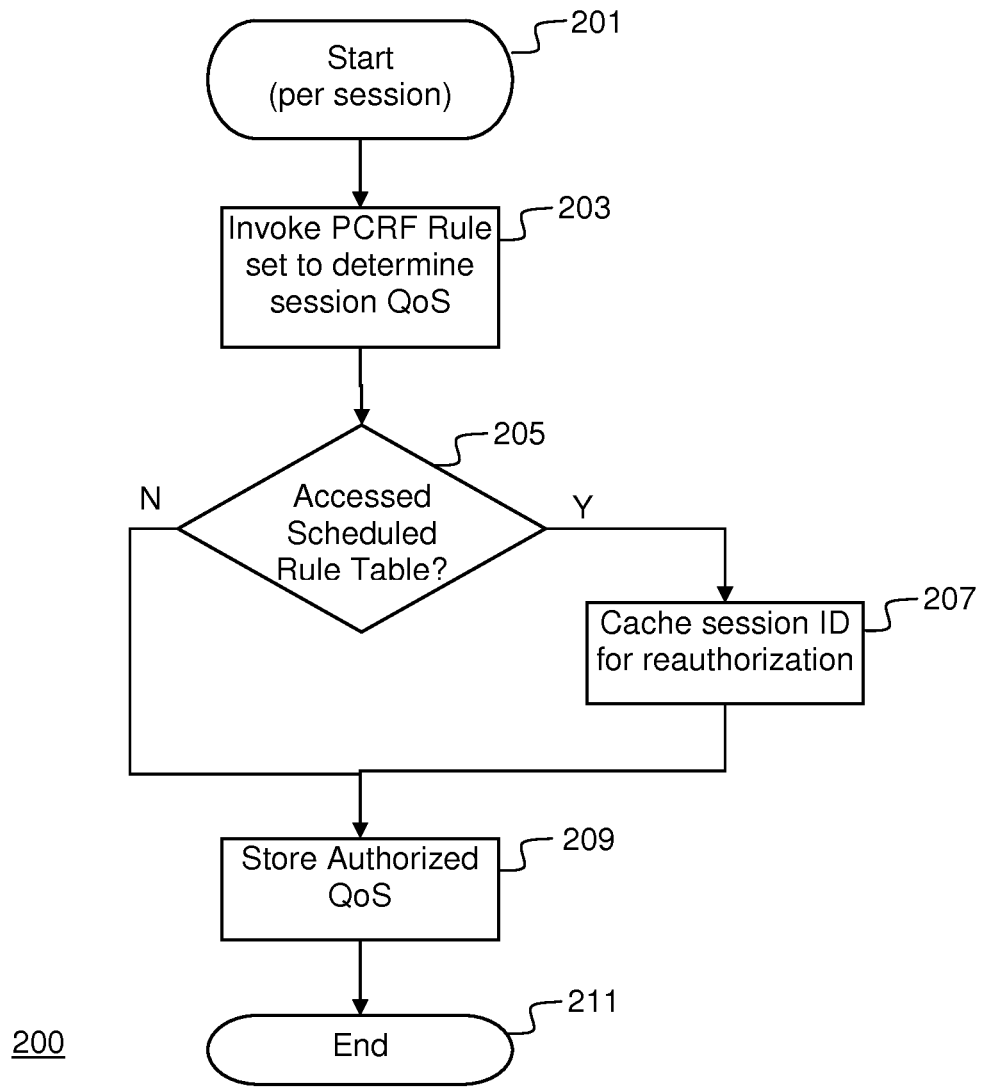
FIG. 2 illustrates a process flow diagram illustrating processing PCC rules for time-of-day-based QoS according to an embodiment of the invention.

FIG. 2 illustrates a process flow diagram illustrating the basic control flow when a PCC rule is created to handle time-of-day events. For example, rule tables can specify a QoS parameter that is generally applicable, and another rule table that has effect during a specific block of time, such as peak network load time for example 8:00 AM to 5:00 PM.

The process 200 is executed on a per-session basis for each subscriber. The process starts at step 201. At step 203 the PCRF invokes a PCRF Rule Set using cascading Rule sets to establish the Authorized QoS including QoS Class Identifier (QCI) and bitrates for a wireless subscriber. The features of various exemplary rule sets are described below: in a first rule set, an operator can write rules to decide if a session should be terminated based on subscriber information, usage, time-of-day information or other rule context; in a second rule set an operator can write rules to determine QoS of session using time-of-day information or usage information, or any rule context information; and in a third exemplary rule set, an operator can configure rules using subscriber information, usage information, time of day information, or any rule source context provided by DSC, to determine the PCC rule characteristic which is then sent to PCEF through Gx interface. These rule sets can be prioritized so that they can each have different precedence levels.

At step 205 the PCRF determines if a scheduled rule table was accessed for the any of the rule sets invoked and if so, at step 207, the session ID is cached in a Next Re-Authorization Cache in preparation for time-of-day processing by Session re-authorization Scheduler described below with reference to FIG. 4. If none of the rule tables accessed were scheduled rule tables then caching is not required.

At step 209 the PCRF stores the Authorized QoS so that the Authorized QoS can later be restored if it has been downgraded as a result of usage-based throttling. The process ends at step 211.

Figure 3:
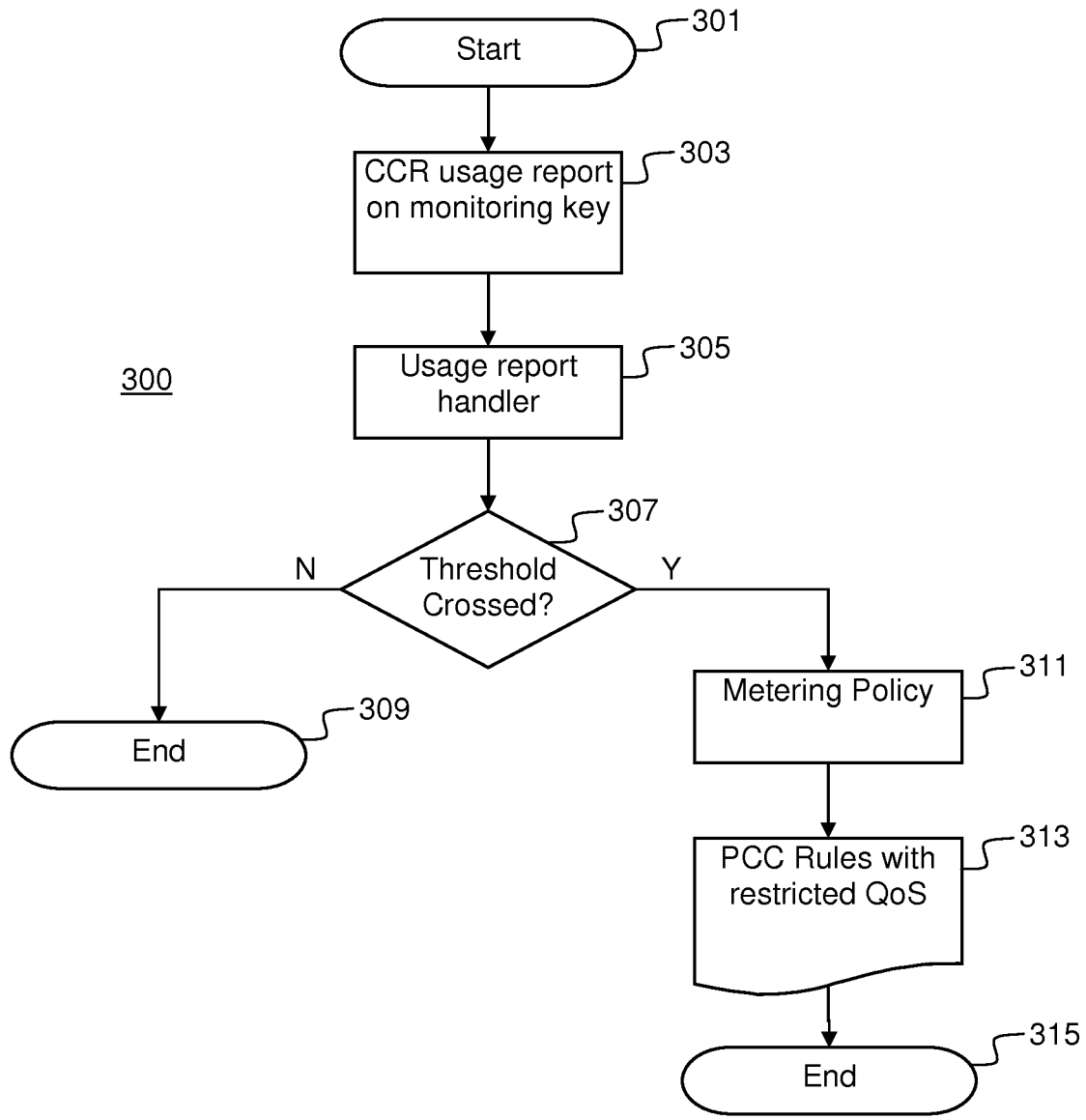
FIG. 3 illustrates a process flow diagram illustrating usage-based processing according to an embodiment of the invention.

FIG. 3 is a process flow diagram illustrating usage-based processing whereby the processing of CCR usage update requests trigger a reauthorization of QoS. The process 300 starts at step 301.

At step 303 the PCRF receives a CCR usage report message from the PCEF reporting a monitoring key, which triggers Usage Report Handler at step 305 which initiates step 307 where the PCRF determines if a usage threshold for the wireless subscriber has been crossed and if so the process continues to step 311 where the PCRF applies a metering policy. If the usage report contains more than one usage monitoring key, the policy of each usage monitoring key will be evaluated.

Metering policy can be implemented as a policy decision module based on meters embodied in the form of metering limit/usage monitoring keys and refers to a set of rules which are based on usage metered for session or flows using a usage monitoring key. Each monitoring key has a set of rule actions defined when a configured usage threshold is crossed.

At step 313 downgrades the QoS by applying PCC Rules with a restricted QoS for the wireless subscriber. PCC rules are sent to the in a RAR message through the Gx interface to the gateway (PCEF). The process then ends at step 315.

If at step 307, the threshold is not crossed, then the process ends at step 309.

The session-level usage monitoring key can be used to monitor session level usage and control session level QoS, such as default Evolved Packet System (EPS) bearer, Aggregate Maximum BitRate (AMBR), and Maximum BitRate (MBR) in CPRS. Session level key can also be used to redirect the traffic by sending different predefined PCC rules or provisioned PCC rule template. Session level key can also be used to control the QoS of all PCC rules within the IP-CAN session. PCC rule-level usage monitoring key can be used to monitor flow level usage and control flow level QoS for PCC rules with the same PCC rule key assigned. It can not be used to change QoS of another flow within the same IP-CAN session but with different usage monitoring key.

With the increasing usage in wireless network due to applications moving towards mobile, it is advantageous to provide a flexible way to control network congestion based on Time-of-Day. Embodiments of the present invention create an IPCAN Session Re-Authorization Scheduler to allow a network to use a DSC rule table schedule to perform scheduled reauthorization, thus changing a subscriber's bandwidth based on time-of-day.

Figure 4:
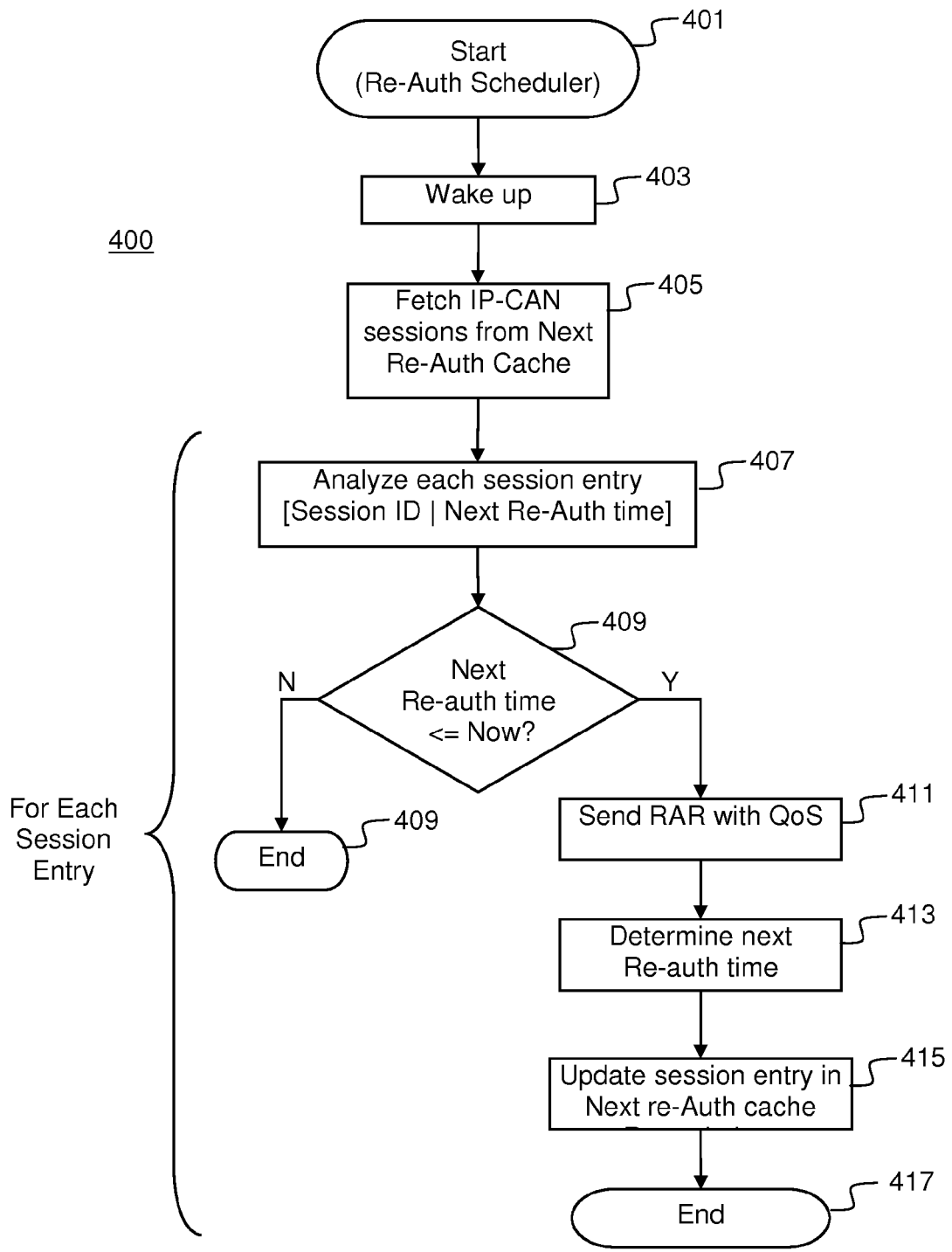
FIG. 4 illustrates a process flow diagram illustrating a Re-Authorization Scheduler according to an embodiment of the invention.

FIG. 4 illustrates the basic control flow of an IP-CAN Session Re-Authorization Scheduler to schedule the Re-Authorization of IP-CAN sessions. The process starts at step 401. At step 403 the IP-CAN Session Re-Authorization Scheduler wakes up, triggered by a time-of-day clock. At step 405, the Session Re-Authorization Scheduler fetches IP-CAN session entries from the Next Re-Authorization Cache which was populated at step 207. At step 407 the Session Re-Authorization Scheduler analyzes each session entry. Step 409 determines if the Next Re-Authorization time of the session entry is now (or earlier), and if so, at step 411a Re-Authorization Request (RAR) message is sent to the gateway (PCEF) on interface Gx, with the updated QoS. AT step 413, the Next Re-Authorization time is calculated and at step 415, the session entry is updated in the Next Re-Authorization Cache. If there is no Next Re-Authorization time, the session entry is purged. The process ends at step 417. If at step 409, the Next re-authorization time is not now, then the session entry is ignored and it remains in the Next Re-Authorization Cache for later processing.

Because PCC rule level QoS can be downgraded by a session level key and by a PCC rule level key when both have usage threshold crossed, an arbitration mechanism between IP-CAN session level and PCC rule level QoS control is used to make the final decision on the final QoS downgrade. In the case of a bandwidth change factor, which specifies what bandwidth value should be applied to the flow, the arbitration mechanism compares the downgrade factor of the session level key and the downgrade factor of the PCC rule key and selects the stronger downgrade factor. In the case of a charging ID (service ID and rating group), the values set by PCC rule level key will take precedence. In other cases, the final decision will be composed of the combination decisions of both.

During a monthly rollover, if a subscriber's QoS (or bandwidth) has been downgraded due to usage exceeding certain threshold in the previous month, the usage value will be reset for affected subscribers and the corresponding QoS will be restored to the original level (which was stored at step 209), as part of the usage reset operation.

The wireless IP-CAN session re-authorization scheduler can perform scheduled reauthorization based on the rule table schedule information to schedule reauthorization of wireless user session, which runs through the QoS rule set and/or Dynamic Rule Creation rule set, to change QoS based on the time-of-day information. Note that usage data can also be used as a condition to change the QoS for a subscriber, in addition to time-of-day information based on rule table scheduler, as a combined condition to determine what service level QoS should be applied to the subscriber.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Numerous modifications, variations and adaptations may be made to the embodiment of the invention described above without departing from the scope of the invention, which is defined in the claims.

What is claimed is:

1. A Policy and Charging Rules Function (PCRF) node for a 3GPP-compliant packet data network, the PCRF node configured to:
    receive from a Policy and Charging Enforcement Function (PCEF), a subscriber usage level on a usage report handler, wherein the usage report handler monitors a monitoring key, the monitoring key corresponding to a type of subscriber usage, at least one threshold amount of usage, and a policy to be applied if the subscriber's usage exceeds the threshold;
    monitor the usage of the subscriber by adding the amount of usage to a record of an accumulated usage of the subscriber in a usage recorder that updates and stores in a subscriber record, the subscriber's accumulated usage based on the monitoring key corresponding to the subscriber usage, wherein the subscriber's record includes a set of monitoring keys;
    determine a current time period;
    authorize a Quality of Service (QoS) for the subscriber based at least on the usage of the subscriber and the current time period a policy engine that applies the policy of a monitoring key if the subscriber's usage has exceeded the at least one threshold of the monitoring key; and
    transmit an authorization message indicating the QoS that the network should provide to the subscriber.

2. The PCRF node of claim 1, wherein said authorized QoS is restricted if said usage of the subscriber exceeds a threshold.

3. The PCRF node of claim 2, wherein said authorized QoS is determined by a Policy and Charging Control (PCC) rule set.

4. The PCRF node of claim 3, wherein said authorized QoS is communicated to a Policy and Charging Enforcement Function (PCEF).

5. The PCRF node of claim 4, further comprising a reauthorization scheduler that determines that a session must be reauthorized based on a change in current time period, wherein the PCRF reauthorizes the session by determining a new QoS based on the current time period.

6. The PCRF node of claim 5, wherein said authorization message comprises a Re-Authorization Request (RAR) message.

7. A method at a Policy and Charging Rules Function (PCRF) node for authorizing a Quality of Service (QoS) for a wireless subscriber, the method comprising steps of:
    receiving from a Policy and Charging Enforcement Function (PCEF), a subscriber usage level;
    monitoring a monitoring key, the monitoring key corresponding to a type of subscriber usage, at least one threshold amount of usage, and a policy to be applied if the subscriber's usage exceeds the threshold;
    monitoring the usage of the subscriber by adding the amount of usage to a record of an accumulated usage of the subscriber;
    updating and storing in a subscriber record, the subscriber's accumulated usage based on the monitoring key corresponding to the subscriber usage, wherein the subscriber's record includes a set of monitoring keys;
    applying the policy of a monitoring key if the subscriber's usage has exceeded the at least one threshold of the monitoring key;
    determining a current time period;
    authorizing a Quality of Service (QoS) for the subscriber based at least on the usage of the subscriber and the current time period; and
    transmitting an authorization message indicating the QoS that the network should provide to the subscriber.

8. The method of claim 7, wherein said authorized QoS is restricted if said usage of the subscriber exceeds a threshold.

9. The method of claim 8, wherein said authorized QoS is determined by a Policy and Charging Control (PCC) rule set.

10. The method of claim 9, wherein said authorized QoS is communicated to a Policy and Charging Enforcement Function (PCEF).

11. The method of claim 10, wherein said determining step determines that a session must be reauthorized based on a change in current time period, wherein the PCRF reauthorizes the session by determining a new QoS based on the current time period.

12. The method of claim 11, wherein said authorization message comprises a Re-Authorization Request (RAR) message.

13. A non-transitory machine-readable storage medium encoded with instructions for a Policy and Charging Rules Function (PCRF) node, the machine-readable storage medium comprising:
    instructions for receiving from a Policy and Charging Enforcement Function (PCEF), a subscriber usage level;
    instructions for monitoring a monitoring key, the monitoring key corresponding to a type of subscriber usage, at least one threshold amount of usage, and a policy to be applied if the subscriber's usage exceeds the threshold;
    instructions for monitoring the usage of the subscriber by adding the amount of usage to a record of an accumulated usage of the subscriber;
    instructions for updating and storing in a subscriber record, the subscriber's accumulated usage based on the monitoring key corresponding to the subscriber usage, wherein the subscriber's record includes a set of monitoring keys;
    instructions for applying the policy of a monitoring key if the subscriber's usage has exceeded the at least one threshold of the monitoring key;
    instructions for determining a current time period;

instructions for authorizing a Quality of Service (QoS) for the subscriber based at least on the usage of the subscriber and the current time period; and instructions for transmitting an authorization message indicating the QoS that the network should provide to the subscriber.

* * * * *